March 12, 1957     H. T. AVERY     2,784,792
VARIABLE PITCH ROTARY WING CONTROL SYSTEM
Original Filed May 15, 1946     3 Sheets-Sheet 1
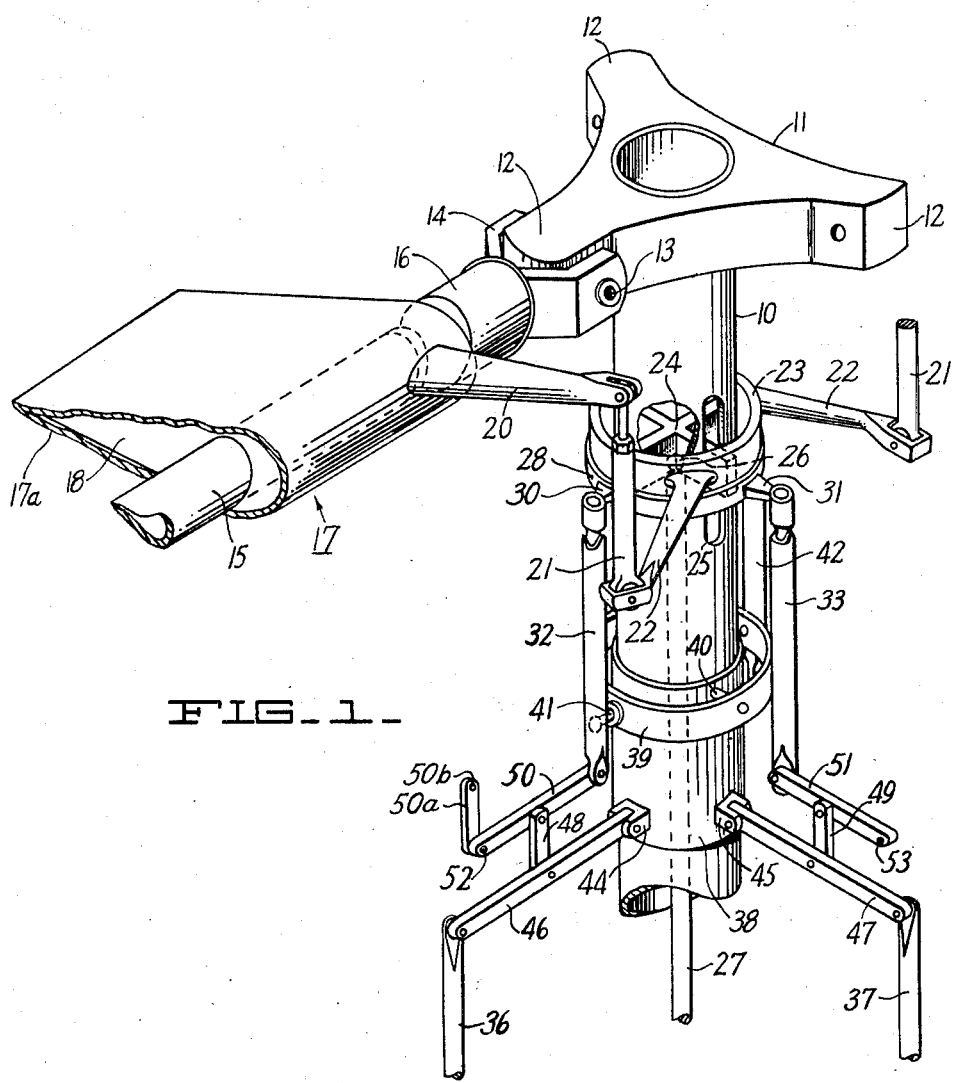
FIG_1_
INVENTOR.
HAROLD T. AVERY
BY
ATTORNEY March 12, 1957     H. T. AVERY     2,784,792
VARIABLE PITCH ROTARY WING CONTROL SYSTEM
Original Filed May 15, 1946     3 Sheets-Sheet 2
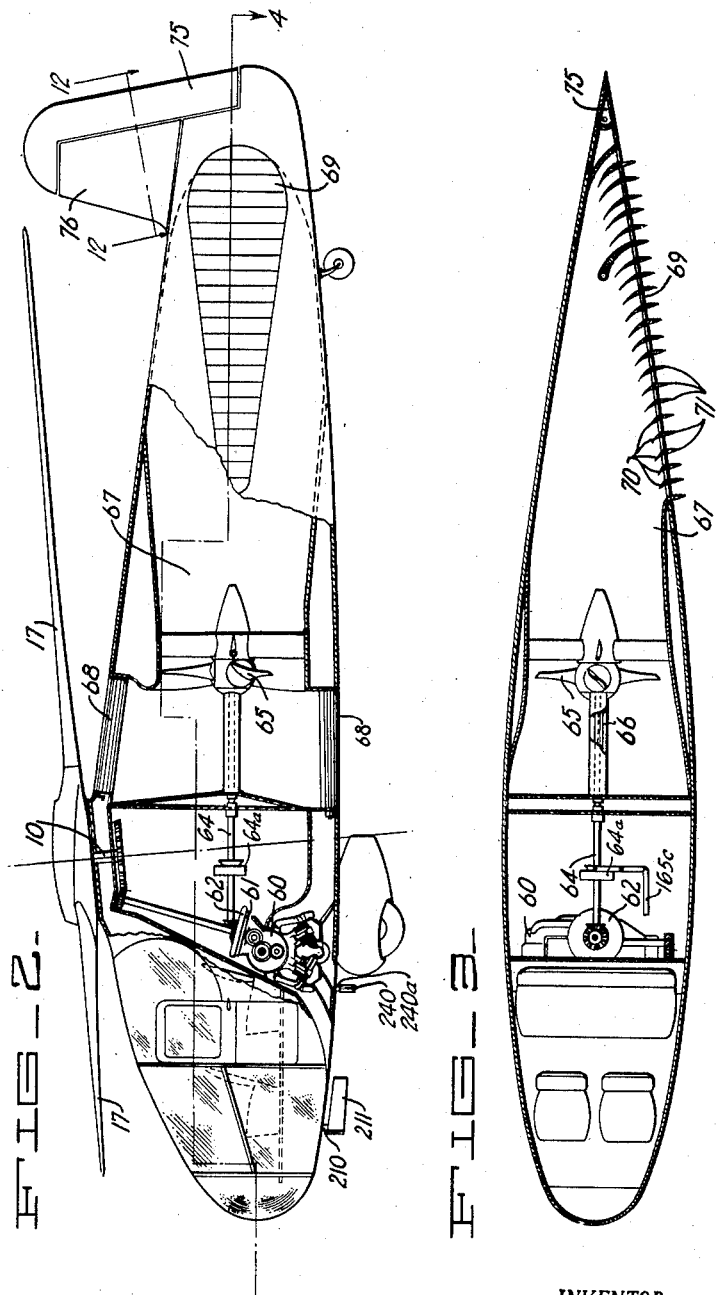
INVENTOR.
HAROLD T. AVERY
BY
ATTORNEY March 12, 1957     H. T. AVERY     2,784,792
VARIABLE PITCH ROTARY WING CONTROL SYSTEM
Original Filed May 15, 1946     3 Sheets-Sheet 3

INVENTOR.
HAROLD T. AVERY
BY

ATTORNEY

United States Patent Office 2,784,792
Patented Mar. 12, 1957

2,784,792

VARIABLE PITCH ROTARY WING CONTROL SYSTEM

Harold T. Avery, Oakland, Calif., assignor to Minneapolis-Honeywell Regulator Company, Minneapolis, Minn., a corporation of Delaware Original application May 15, 1946, Serial No. 669,790. Divided and this application September 22, 1952, Serial No. 314,389

11 Claims. (Cl. 170—135.74)

The present invention relates to helicopters, and particularly to the controls which serve to keep the operation of the craft in accord with the performance desired by the operator of the craft. This application is a divisional application of my prior application Serial No. 669,790, filed May 15, 1946, now abandoned.

Up to the present time all aircraft have required a relatively high degree of training and/or skill to operate. With the airplane this has been primarily due to the relatively high craft speed required to maintain control of the craft. The helicopter entirely gets away from this necessity of thus maintaining air speed, and therefore would be one of the easiest of all vehicles to operate were it not for the fact that as so far known and operated the helicopter has peculiar operational difficulties of its own. These difficulties are primarily traceable to the fact that the helicopter is capable of a greater variety of kinds of movement than the airplane, and it has been customary to provide separate manual control for each of these various kinds of movements in the helicopter to an extent which increases the number of various control devices with which the operator must continuously be concerned distinctly above that customary in the airplane. Combined with the extent to which these various movements and control functions are inextricably inter-related in the helicopter, this has rendered the controlling of a helicopter equipped with conventional controls as known in the art, more difficult than the controlling of the airplane in spite of the fact that the most serious airplane control difficulties are eliminated.

For instance, if it is desired to increase forward speed on a typical prior art helicopter it is ordinarily necessary for the operator to (1) readjust a pitch control lever to increase the pitch of the rotor blades, (2) readjust the setting of the engine throttle to secure proper engine and rotor speeds, (3) readjust steering pedals to accurately counteract the rotor torque which has thus been increased, (4) readjust the lateral position of the control stick first to balance the increase in counter-torque, and then as the speed of the craft increases to compensate for the greater differential between the lift exerted by the advancing and the receding blades, and (5) rock the control stick forward to increase forward tilt of the craft so as to convert the additional power into forward movement rather than upward movement, and return the stick to its normal position again when the tilt of the craft has been sufficiently increased. If all five of these controls are not readjusted in exactly the right amounts and the right synchronism and/or sequence the craft will commence to perform one or more unwanted movements or gyrations. Obviously this number of control movements is not too many to properly co-ordinate without a high degree of skill and training. This is particularly unfortunate in view of the fact that the helicopter seems to otherwise have very promising potentialities for becoming the widely used personal craft of the air.

It is an object of this invention to simplify the control arrangements for helicopters and to render it easier to properly manipulate them.

It is also an object to provide such a grouping and arrangement of the various manual control members as will not only result in an unprecedented degree of convenience in controlling the craft, but will be so simple and logical in arrangement as to render the operator's control of the craft inherently correct with little or no training required.

It is also an object to provide means selectively available to the operator for automatically steadying the craft relative to the ground, or relative to the surrounding air, or both.

It is an object of the invention to automatically maintain the engine and rotor at proper operating speeds.

It is also an object to automatically readjust these speeds to meet various operating conditions.

It is a further object to provide in conjunction with an engine and rotor so controlled, means by which the operator may conveniently, if and when he so desires, bring the engine and rotor to speeds higher than the automatically controlled speeds above mentioned.

It is also an object to prevent the engine and rotor from ever being brought to dangerously high rotational speeds.

It is an object of the invention to make it readily possible for the operator to supersede the automatic control of a given craft function by manual control thereof.

It is a further object to render it exceptionally easy to smoothly adjust rotor pitch. More specifically it is proposed to do this by employing a servo-motor, and it is a further object to insure against stalling of the rotor even though the pitch controlling servo-motor should fail simultaneously with failure of the main engine and while the rotor blades are operating at pitch angles greater than those capable of producing autorotation of the rotor.

It is particularly an object to provide such automatic safety against stalling the rotor in such a manner that the operator may still retain manual control of pitch and may even increase pitch above the auto-rotational range of pitches for short periods, as for instance in easing the contact of the craft with the ground.

The manner in which the foregoing, together with additional objects and advantages of the invention, are attained will be made apparent in the course of the following description of the preferred embodiments thereof which is to be read with reference to the accompanying drawings, in which:

Figure 1 is a schematic view in perspective showing a portion of the rotor of a craft embodying my invention, particularly the rotor hub and driving shaft, a portion of a typical blade and the means for controlling the pitch of the blades, several of the parts being partially broken away in order to better expose other parts to view.

Figure 2 is a side elevation of the form of helicopter in which I prefer to incorporate my invention.

Figure 3 is a horizontal section of the same craft taken substantially on line 4—4 of Figure 2.

ROTOR CONSTRUCTION (FIG. 1)

Figure 4:
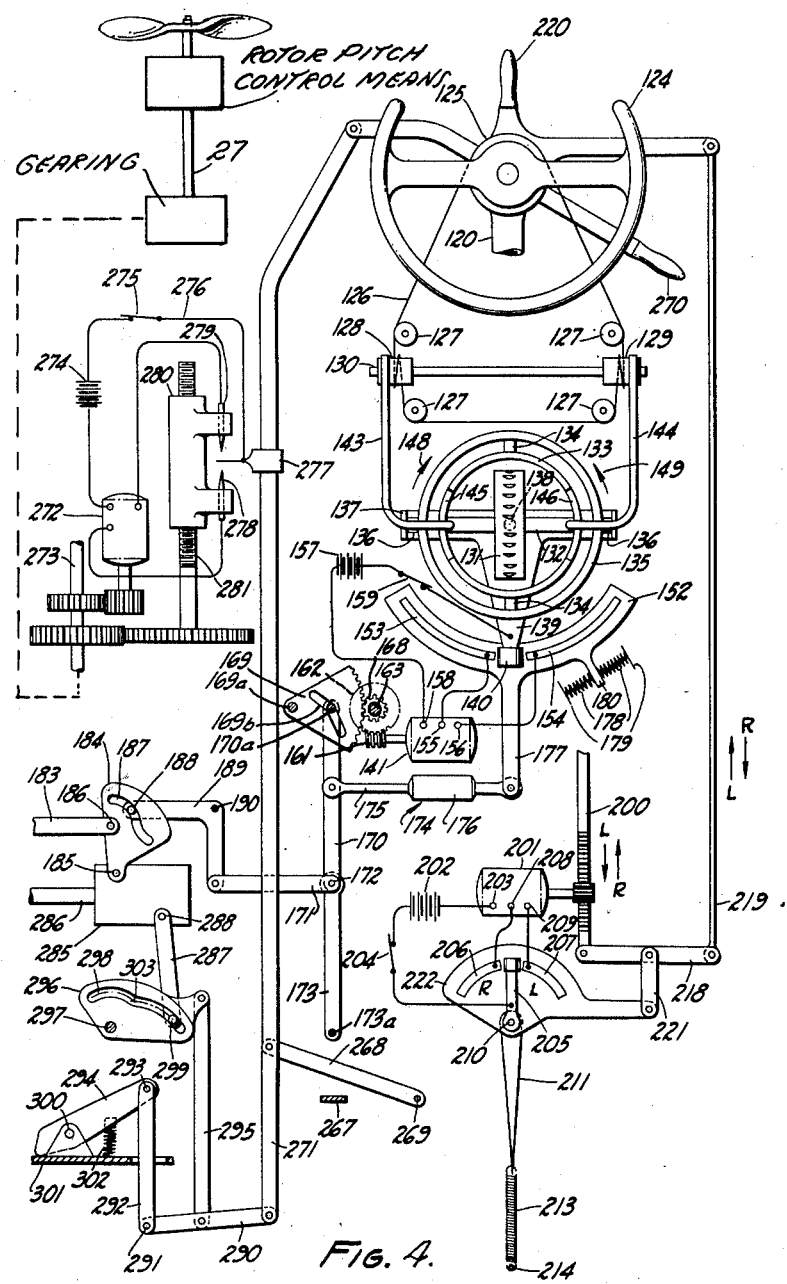
Figure 4 is a drawing showing schematically the principal automatic controlling mechanisms of the craft, the principal manually movable members for exercising control of the craft, and the general nature of the relationship of these to each other.

Figure 1 illustrates schematically a typical rotor such as may be used for sustaining a craft embodying my invention, which rotor is in turn controlled by certain of the novel mechanisms of my invention.

The arrangement shown in Figure 1 for transmitting the drive and pitch control movements to the rotor blades corresponds in general to that of the NX-1272 helicopter illustrated and described in an article in "Aviation" for June, 1945 at pages 122 to 130, to which article reference may be had for details of construction previously known in the art and therefore not disclosed herein. A rotor drive tube 10 is adapted to be driven in a counterclockwise direction by an engine mounted in the fuselage of the craft. Integrally attached to the upper end of the shaft 10 is a hub member 11 which, in the particular form illustrated, has three arms 12 to each of which a blade such as the blade 17 is pivotally attached by a substantially horizontal hinge 13, only one of the three hinges and blades being shown in the drawing, however. Each blade 17 includes a blade root member 14 which is pivotally attached to the hub member 11 by one of the hinges 13 and is pivotally connected to a blade spar 15 by a pivotal mounting 16, which permits each spar 15 to be rocked on its own axis relative to the root member 14 to change the pitch of the blade. The blade shell 17a is integrally attached to spar 15 by means of ribs 18. This constitutes what is generally termed an articulated rotor. Optionally each blade may also be equipped with a generally vertical drag hinge (not shown) and/or other cushioning means between the engine and the blades, but the presence of any or all of such hinges and means does not appreciably alter the functioning of the novel mechanism in the craft.

Control means are provided which, by selective adjustment, may cause either simultaneous and equal change of pitch of all blades or may cause the pitch of each blade to be cyclically increased and decreased as the rotor rotates, the angular location and magnitude of such cyclic changes being dependent upon the direction and magnitude of movement, respectively, of elements of the control means.

This control means comprises a pitch control arm 20 integral with each blade 17 and pivotally connected for universal movement to the upper end of a pitch control link 21. The lower end of each link 21 is pivotally connected for universal movement to one of three arms 22 of a pitch control spider 23. Integral with spider 23 are cross members 24 which extend inwardly through slots 25 in the rotor drive tube 10 and are pivotally supported by a ball 26 on the upper end of a pitch control rod 27; this arrangement being such that spider 23 is constrained to rotate with shaft 10. Through a thrust bearing mounting of the general character disclosed in the article previously referred to, spider 23 is connected to a non-rotating ring 28; the arrangement being such that spider 23 and ring 28 may be tipped as a unit in any direction by control movements imparted to ring 28. Integral with the ring 28 at two positions, preferably 90° removed from each other, are two arms 30 and 31 which are universally connected to two control rods 32 and 33, respectively, which control rods are subject to displacement in a substantially vertical direction in a manner to be hereinafter described. Vertical movement of control rods 32 and 33 may thus be utilized to effect tilting of ring 28 in any desired direction.

Spider 23 and ring 28 also may be raised or lowered as a whole, without altering their tilt, by raising or lowering the pitch control rod 27 upon which they are universally mounted by means of the ball 26, and means to be hereinafter described, are provided for vertically positioning rod 27. Such raising or lowering will correspondingly increase or decrease the pitch of all blades; the movement of the pitch control rod 27 introducing a simultaneous and substantially identical change of pitch to all blades; and links 32 and 33 being constrained to move up and down in unison with rod 27 by mechanism which will be described presently.

Any vertical movement of either or both of the control rods 32 and 33 relative to the pitch control rod 27 will, however, cause a change in the tilt of spider 23 and ring 28 and hence a change in the cyclic pattern of pitch distribution, for if the spider and ring are not perpendicular to shaft 10, they will cause the pitch of each blade to be cyclically increased and decreased as the rotor rotates, the angular location of these cyclic changes depending upon the direction of tilt of the spider and ring and the amount of the cyclic changes depending upon the amount of tilt of the spider and ring.

These cyclic changes of pitch of the blades tend to bring about a tilt in the effective plane of rotation of the rotor (without tilting the rotor hub), but the direction of such rotor tilt is, in general, not the same as the direction of spider tilt due to the angle subtended in the plane of rotation between the positions thereon of each arm 22 and its corresponding blade spar 15 and to such effects as that of blade inertia in displacing the rotational position of the blade at the instant of maximum response from its position at the instant of effecting the adjustment causing the response. Nevertheless there is a definite relationship between the direction of tilt of the spider 23 and ring 28 and the direction of tilt that the effective plane of rotation of the rotor eventually tends to assume as a result thereof.

Control rods 32 and 33 are constrained to move vertically in synchronism with the pitch control rod 27 whenever a general increase or decrease of pitch is to be effected by the latter without changing the tilt of the pitch control spider 23; the arrangement being such as will nevertheless permit independent movement of the control rods 32 and 33 with respect to the pitch control rod 27 for the purpose of changing the tilt of the pitch control spider 23. To provide for this, rod 32 is connected to a tilt-control rod 36, as well as to rod 27, in such a manner that the vertical displacements of rod 32 will be equal to those of rod 27, plus displacements equal or proportional to those of the tilt control rod 36. Rod 33 is similarly connected to rod 27 and a second tilt control rod 37. Hence each vertical position of rod 36 relative to the craft causes rod 32 to assume a corresponding vertical position relative to the pitch control rod 27 and hence to introduce to ring 28 and spider 23 a certain component of tilt which is maintained unchanged as long as tilt control rod 36 is held stationary, regardless of the vertical movement that may be imparted to the ring and spider by pitch control rod 27 or the change in tilt about the coordinate axis that may be imparted to the rings by the second tilt control rod 37. The second tilt control rod 37, in turn, is connected to the ring and spider in a similar manner to give a similar result with respect to its own axis of tilt.

The mechanism for connecting rod 32 to rods 36 and 27 so that it will respond in the manner above described includes a sleeve 38 slidably mounted on tube 10, but restrained from rotating therewith. In order to constrain sleeve 38 to move vertically in unison with rod 27, it is pivotally connected to a ring 39 by two coaxial pivot pins 40 (only one of these pins being visible in the drawing). At a point 90° removed from pins 40, an arm 41 integral with the ring 39 is pivotally connected to the rod 32. Another rod 42 directly on the opposite side of tube 10 from rod 32, is similarly connected to rings 28 and 39. Although ring 39 will not in general be maintained parallel to ring 28, the diameter of ring 39 which is pivotally connected to rods 32 and 42 will be maintained parallel to and at a fixed vertical distance from the diameter of ring 28 to which these links are pivotally attached and hence at a constant average height relative to rod 27, hence constraining the axis of pins 40, which intersects this diameter at its mid-point, to intersect the axis of rod 27 at a fixed point in the rod. Hence as rod 27 is moved up or down sleeve 38 moves correspondingly in unchanging vertical relationship to rod 27, even though separated from it by the walls of the rotating tube 10. Pivotally attached to the sleeve 38 by brackets 44 and 45, respectively, are levers 46 and 47, the outer ends of which are pivotally attached to the tilt control rods 36 and 37, respectively. The mid-points of these two levers are connected by normally vertical links 48 and 49, respectively, to the mid-points of levers 50 and 51, respectively, the inner ends of which levers are pivotally connected to rods 32 and 33, respectively. The outer end of lever 51 is pivotally mounted at 53 on a pin fixed in the framework of the craft, while the outer end of lever 50 is pivotally connected to a link 50a pivotally mounted at 50b on a pin fixed in the framework of the craft.

This mechanism is therefore such that if with tilt contol rods 36 and 37 held fixed, pitch control rod 27 be raised or lowered, sleeve 38 and the inner ends of levers 46 and 47 will be raised or lowered by an identical amount, which through links 48 and 49 will cause the mid-points of levers 50 and 51 to be raised or lowered by half this amount, which levers rocking about their fixed pivots 52 and 53 will cause rods 32 and 33 to be raised or lowered by the same amount as rod 27. On the other hand, if with pitch control rod 27 held stationary, tilt control rod 36 and 37 is raised or lowered, the mid-point of the corresponding lever 50 or 51 will be raised or lowered by half as much, thereby causing the corresponding rod 32 or 33 to be raised or lowered by the same amount as the tilt control rod 36 or 37 which was moved.

In order that pitch control rod 27 may raise or lower spider 23 and ring 28 without tilting them, it is essential that vertical movement of rod 27 shall cause identical vertical movement of rods 32 and 33. Also, the movement imparted to these rods by tilt control rods 36 and 37 should be related to, but not necessarily identical with that of the latter rods. Therefore, if for any reason it should prove desirable to have anything other than a 1:1 ratio of movement between the respective rods 36 and 37 and their respectively associated rods 32 and 33, links 48 and 49 may be attached at points further in or out than the mid-points of their respective levers, so long as the rod is attached the same fractional distance out on each of the levers to which it is attached so as to maintain a 1:1 ratio of movement between rod 27 and the rods 32 and 33.

It is apparent that the above described mechanism will function so that regardless of the average pitch of the blades as determined by the position of the pitch control rod 27, there will be a specific vertical position of tilt control rod 36 which will bring the diameter of ring 28 which it controls into a position perpendicular to the axis of shaft 10, and that displacement of rod 36 in one direction from this position will cause tilt of the ring in one direction, while displacement therefrom in the other direction will cause tilt in the other direction; and that the positioning of tilt control rod 37 similarly controls the titling of the ring in directions perpendicular thereto.

This tilting will control the cyclic pitch in any desired manner in view of the fact that these two components of tilt may be combined to give any desired direction and amount of tilt to the ring and that when the ring is held perpendicular to shaft 10 all blades are maintained at uniform pitch settings throughout their rotation, while when the ring is tilted the pitch of each blade is cyclically increased and decreased as it rotates, the cyclic position of each increase and decrease depending upon the direction of tilt and the amount of increase and decrease depending upon the extent of tilt. The entire arrangement may, for instance, be so oriented in the craft that tilt control rod 36 will control the tilting that normally affects forward and backward movement of the craft and tilt control rod 37 control the tilting which normally affects lateral movement thereof.

Figures 2 and 3 illustrate the general form and arrangement of the craft in which my invention is preferable embodied, though it is to be understood that the invention is by no means limited to use in the type of craft here illustrated, nor in conjunction with the particular rotor arrangement illustrated in Figure 1. As shown in Figures 2 and 3 the engine 60 is connected, through a train comprising appropriate shafts and gearing and including over-running clutch 67 and hydraulic clutch 62, to the rotor shaft 10 to drive same at a suitable reduction ratio from the engine.

Pitch control

As previously described, vertical displacement of pitch control rod 27 (Fig. 1) produces a substantially identical change of pitch simultaneously on all blades, thereby altering the total thrust exerted by the rotor at any given speed of rotation. It is the customary practice in helicopters to link the pitch control member of the rotor (such as rod 27) to a manually positioned lever so that the operator may directly alter the pitch of the rotor blades by manual displacement of the lever.

Figure 5:
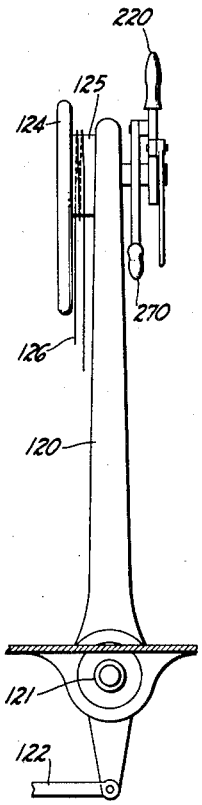
Figure 5 is a side view of a control column carrying control members arranged as schematically indicated in Figure 4.

As schematically illustrated in Figures 4 and 5, I provide a manually adjustable pitch control lever 270, which for convenience is pivoted coaxially with the steering wheel 124 a short distance in back of the steering wheel. As schematically indicated in Figure 4, the rocking of lever 270 causes reciprocation of link 271 to which it is pivotally connected. Link 271 is guided near its other end by link 268, pivotally mounted on fixed pin 269 and the downward movement of link 268 and hence of link 271 is limited by the fixed lug 267. It would be possible to mechanically connect link 271 to the pitch control member 27 of Figure 1 so that the rocking of arm 270 would physically effect the desired changes of rotor pitch, and the general objectives of my invention would be obtainable with such an arrangement, but because of the fact that considerable load is ordinarily involved in effecting such changes of pitch, and that such load is frequently so irregular as to make it difficult to smoothly effect pitch changes, and in view of the fact that I prefer to keep lever 270 reasonably short and to move it through a reasonably short stroke, I prefer to provide a servo-motor under control of lever 270 for actually supplying the power to effect the pitch changes.

Because of the necessity for very promptly decreasing blade pitch into the auto-rotational range in case of engine failure and the possibility that the servo-motor might simultaneously fail, the use of a servo-motor in this connection would not be feasible except in conjunction with emergency means (to be hereinafter described) for manually changing pitch, and more particularly with an arrangement, such as illustrated in Figure 1 and previously described, whereby the pitch control arm 20, associated with each blade, is located far enough outboard of the flapping hinge 13 so that the amount of rocking up of the blades about their drag hinges that takes place as an incident to a reasonably small decrease in rotor speed will decrease the pitch of the blades into the autorotational range. In combination with both the emergency means for manually changing pitch and the rotor construction mentioned, it becomes perfectly safe and feasible to utilize a servo-motor for pitch control, for if with the blades operating at pitch angles in excess of the autorotational range of pitch angles both the main engine of the craft and the pitch control servo-motor should both simultaneously fail the rotor arrangement would insure the rotor against stalling, but would keep it rotating at a speed sufficiently below its normal power operated speed so that the flapping angle of the blades will be increased sufficiently to raise the trailing end of each arm 20 (Fig. 1) sufficiently to reduce the pitch of such blade to an autorotational angle. At this lowered rotational speed the craft will gradually attain a greater speed of descent than desirable, but by utilizing the manual pitch control means to lower the leading end of arm 20 the autorotational speed may be increased to one that will correspondingly lower the trailing end of arm 20 thereby gradually lowering the speed of descent, or if the manual adjustment is executed soon enough preventing the craft from attaining such higher rate of descent. Without the emergency manual pitch adjusting means the craft would be in danger of attaining too high a rate of descent for complete safety, while without the particular rotor arrangement described there would be serious danger of the rotor becoming completely stalled under the particular circumstances outlined, before the pilot could get the mechanism switched over to emergency manual control and get the pitch setting lowered, but with both the manual arrangement and the rotor construction referred to, it becomes not only perfectly safe to employ a servo-motor for effecting pitch change, but the entire arrangement becomes safer than the present conventional helicopter construction.

Most of the mean previously proposed for insuring against stalling of the rotor in case of engine failure have been objectionable because they prevented the operator from thereafter exercising control over pitch and particularly from increasing pitch above the autorotational range just prior to contact with the ground in order to render a large part of the kinetic energy of the rotor available in checking the rate of descent at the moment of contact. My arrangement, however, provides this safety without interfering with the operator thus controlling pitch. For instance if the engine and servo-motor have failed at the time of a high rotor pitch setting, the operator may bring into operation the manual control arrangement after engine failure, as above suggested, and lower the pitch control setting so as to reduce the coning angle effective at a given autorotational pitch thereby increasing autorotational speed. In any case, if the pitch control lever is below its maximum position, the operator may at any time raise the pitch of all blades above autorotational pitch, but for a given displacement of the pitch control lever the increase in pitch above the autorotational range will only remain effective until the rotor slows down sufficiently to decrease the coning angle sufficiently to raise the blade axis in line with arm 20 sufficiently to restore autorotational pitch. Thus the use of the emergency manual pitch control with the blade hinging and pitch arm arrangement shown makes it possible for the operator to secure an exceptionally high autorotational speed and to utilize most of the kinetic energy thus stored in the rotor for sharply checking descent without at any time being in danger of completely stalling the rotor.

A servo-motor arrangement for controlling rotor blade pitch is schematically illustrated in Figure 4. In this arrangement link 271, which is reciprocated by rocking of the pitch control lever 270, instead of being connected by direct linkage to the pitch control member of the rotor (rod 27, Fig. 1) as in present known helicopters, controls the operation of servo-motor 272, which through appropriate gearing drives output shaft 273, which shaft is connected through further reduction gearing to rotor pitch control rod 27 (Fig. 1), so that rotation of shaft 273 in the one or the other direction serves to raise or lower said rod. Servo-motor 272 is a reversible electric motor, like motors 141 and 201 previously described, and its circuit is essentially the same as theirs, the negative side of power source 274 being connected to one terminal of the motor, and the positive side of said source being connected through switch 275 and lead 276 selectively to one or the other of the two remaining motor terminals to cause the motor to operate in the one or the other direction. This selectivity of connection is brought about by carrying lead 276 to the contact member 277 integrally mounted on link 271, which contact member is designed to selectively cooperate with two contact members 278 and 279 carried by the carriage 280, which carriage is mounted as a nut on threaded shaft 281, which shaft is geared to and driven by shaft 273 in proportion to its rotation. Thus carriage 280 is fed up or down on shaft 281 in proportion to the rotation of shaft 273 and its vertical position is at all times indicative of the current pitch adjustment of the rotor.

If the operator raises the right end of lever 270 to increase pitch, this lowers contact member 277 substantially in proportion, bringing it into contact with contact member 278 and thereby starting motor 272 operating to increase pitch and to lower carriage 280. As soon as carriage 280 has been lowered a distance equal to that by which lever 270 lowered member 277, member 278 moves out of contact with member 277 thus stopping the motor. The rocking of lever 270 in the opposite direction brings contact members 277 and 279 into contact and operates the motor in the opposite direction, the amount of motor movement always being proportional to the travel of contact member 277 and follow-up travel of carriage 280. The motor speed may be great enough to very quickly follow each readjustment of pitch control lever 270, and there may either be a yield such as schematically indicated by the flexible tip of member 277 to permit the movement of lever 270 to proceed in advance of the follow-up movement, or if the motor speed is great enough it will prove almost equally satisfactory to omit the yield in which case lever 270 will be physi-blocked from moving faster than the motor can change pitch.

*Engine control*

I prefer to provide for the control of the speed of the engine and rotor through an adjustable speed governor 285 (Fig. 4).

While it would be equally possible to apply my invention either to a governor arranged to selectively adjust load to meet manually controlled engine power (as by selectively adjusting total pitch of the rotor, for instance), or to a governor arranged to selectively adjust engine power to meet manually controlled load, I have specifically shown only the latter, wherein the governor selectively readjusts the engine throttle setting so as to maintain the engine at substantially the speed for which the governor is set, regardless of such readjustments of rotor blade pitch and consequent changes in load as the operator may effect. Such adjustable speed governors are well known, and therefore I shall only schematically indicate the governor and its input, output, and control members. The governor is driven by shaft 286 which leads directly from the engine and is always rotated in proportion to the engine crankshaft. In a manner corresponding to that well known in governors it operates to readjust the engine throttle setting by appropriate angular repositioning of shaft 185 on which segment 184 is integrally mounted. As previously described, link 183, pivotally attached to segment 184 transmits this movement to the engine throttle and thereby effects the control of engine speed.

The speed at which the governor thus controls the engine may be adjusted within a desired range of speeds by the rocking of arm 287 integrally mounted on shaft 288, clockwise rocking of these parts setting the governor to control for higher engine speeds. Aircraft engines are ordinarily designed to give the most satisfactory and economical performance if they are operated at somewhat lower speeds under light load than under heavy load, and most such engines are capable of an especially high output (usually referred to at "take-off" rating) when operated at a still higher speed, which high output is intended only to be employed for short periods of time (for instance not in excess of five minutes at a time) when airplane take-off or other special or emergency condition require an extra measure of power for a short period. Also the helicopter rotor may be designed to operate more efficiently at lower speeds under light load.

Since rotor blade pitch is the principal factor affecting load, the load always being comparatively heavy when blade pitch is high and comparatively light when it is low, I prefer to provide means for automatically readjusting the controlling speed for which the governor is set in accordance with the change of rotor blade pitch. The mechanism for accomplishing this, as schematically shown in Figure 4, comprises a lever 290, one end of which is pivotally attached to pitch control link 271 and the other end of which is pivotally attached by means of pin 291 to link 292, which in turn is pivotally attached by pin 293 to foot pedal 294. Pedal 294 normally stands in the position indicated, so that pin 291 normally acts as a substantially fixed pivot for lever 290. Lever 290 is pivotally attached near the middle of its length to link 295, which in turn is pivotally attached to box cam lever 296 which is pivotally mounted on fixed pivot 297. Lever 296 is provided with a cam slot 298 which embraces the pin 299 integrally mounted in lever 287, which lever as previously mentioned controls the speed setting of the governor 285. As pitch control lever 270 is rocked up to increase rotor blade pitch it will lower link 271, thus carrying link 295 down proportionally, rocking lever 296 clockwise causing cam slot 298 to rock lever 287 clockwise and thereby set the governor for a higher speed. Slot 298 may be so shaped that for each particular pitch setting it will bring the governor speed setting to the ideal speed for a given engine and rotor even though the relationship between blade pitch and desired speed be an irregular one. All of the rocking which may be thus imparted to lever 296 causes pin 299 to traverse only the right portion of the length of slot 298, the maximum pitch setting of lever 270 bringing pin 299 to a position in the slot slightly to the right of point 303, in which position lever 287 will have been rocked far enough clockwise to bring the engine to maximum normal operating speed. The parts reach this position only when the rotor blades have been set to maximum pitch and fixed ear 267 blocks link 268 and prevents link 271 from imparting any further clockwise rocking of lever 296.

However, in connection with take-off or to meet some other special or emergency condition the operator may wish to bring the engine up to the still higher speed of operation which is required for developing the full take-off power of the engine, and to maintain such engine speed for an appropriately short period of time. Since the need for such extra power and speed may appear suddenly the means for securing it should be quickly and readily operable at any time, and since it would be very bad for the engine to operate under these peak conditions for any long periods of time the means should be such that even an inexperienced or casual operator could not accidentally leave them unnoticed in their emergence setting. In order to meet these requirements I provide the foot pedal 294 as the means by which the operator may at will bring the engine up to its maximum take-off speed of operation or to any other chosen speed in excess of its currently governed speed. This pedal is pivotally mounted on shaft 300 which is integrally supported above floor 301, and the pedal is normally held in the raised position illustrated by compression spring 302. If the operator presses down on pedal 294 he thereby lowers link 292 and through lever 290 and link 295 rocks lever 296 further clockwise than the position normally associated with the current position of lever 271 thus increasing the engine speed above that normally associated with the current rotor blade pitch setting. The depressing of pedal 294 clear to the floor rocks lever 296 clockwise through a slightly greater angle than the total range of movement imparted to it by link 271, thus serving to bring stud 299 to at least the position 303 in slot 298, beyond which point the slot is concentric with pivot stud 297. When stud 299 reaches point 303 and stands anywhere in the concentric portion of the slot, arm 287 is rocked to its furthest clockwise position which sets the governor for the take-off speed of the engine regardless of the current pitch setting of the rotor blades. Since it would be dangerous to operate the engine or the rotor in excess of the speeds to which this adjustment brings them, the governor will automatically open the engine throttle by the maximum amount safe under current conditions whenever pedal 294 is depressed to the floor. If the governor over-ride were connected directly to the engine throttle, instead of to the governor speed control as disclosed, then a maximum opening of throttle with a relatively low setting of blade pitch might result in the operator speeding the engine and rotor up to dangerously high speeds in an emergency. As it is the engine will be held at take-off speed only so long as the operator holds the pedal 294 depressed, so that if he is informed of the maximum time for which it is safe to keep the engine at such a speed he can readily avoid exceeding the time limit as he might be in danger of doing if something other than a spring returned member were utilized for securing this extra performance from the engine.

As previously indicated, it would be equally possible to apply my invention to an arrangement in which the operator manually controls the engine throttle and the governor automatically readjusts blade pitch to maintain the desired engine and rotor speed. With either arrangement the manual control lever may be connected to the governor speed setting mechanism to readjust the speed for which the governor is set in accordance with the changing load values for which the manual level is set, and the over-ride mechanism (pedal 294) may be arranged to reset the governor speed control for speeds higher than this up to and including the "take-off" speed of the engine, just as shown in Figure 4 and above described.

With the controls as above described, connected to function as previously schematically outlined, the control of the helicopter which has heretofore required great skill and extensive training, becomes simple and easy.

What I claim is:

1. In aircraft having a prime mover, an element operable to vary the power of the prime mover for controlling the speed thereof, an adjustable pitch airscrew driven by the prime mover, and an element for controlling the average pitch of said airscrew; the combination of a manually positionable member, a governor for regulating the speeds of operation of said prime mover and said airscrew, including a speed adjusting member for altering the speeds at which the governor tends to maintain said prime mover and airscrew, a connection from the manually positionable member to the second of said elements to selectively position it to vary the pitch of the airscrew in accordance with the position of the manually positionable member, a connection from the governor to the first of said elements whereby the governor automatically positions it to regulate speed, and a further connection from the manually positionable member to the speed adjusting member to selectively alter the speed regulation of the governor in accordance with the position of the manually positionable member.

2. In a rotary wing aircraft having a rotor comprising a hub and a plurality of blades, a pitch control member selectively positionable to control the average pitch setting of the blades, and a prime mover for driving the rotor; the combination of a governor for the prime mover, a speed adjustment member displaceable to alter the speed at which the governor tends to maintain the prime mover, and means responsive to movement of the pitch control member for displacing the speed adjustment member.

3. In an aircraft having a prime mover, an element operable to vary the power of the prime mover for controlling the speed thereof, an adjustable pitch airscrew driven by the prime mover, and an element for controlling the average pitch of said airscrew; the combination of a first manually positionable member, a governor including a governor speed setting member for regulating the speeds of said prime mover and said airscrew, a connection from said manually positionable member to the second of said elements to selectively position it in accordance with the position of said member, means for limiting the displacement of the manual member, a differential connection from the manually positionable member to the governor speed setting member, a connection from the governor to the first of said elements whereby the governor automatically positions it to regulate speed, and a second manually positionable member extending to the differential connection for overriding the normal governor speed setting control by the first manually positionable member.

4. In a rotary wing aircraft having a rotor comprising a hub and a plurality of blades, a pitch control member positionable by the operator to selectively control the average pitch setting of the blades, a prime mover for driving the rotor, and a power control element for the prime mover; the combination of a second member positionable by the operator, means including a governor for adjusting the power control element for the prime mover, a speed adjustment member displaceable to alter the speed at which the governor tends to maintain the prime mover, and position change combining means jointly responsive to said two positionable members for displacing the speed adjustment member whereby the first member controls both pitch and speed and the second member merely controls speed of the rotor.

5. The invention set forth in claim 4 in which the maximum speed setting to which the second positionable member acting solely is capable of bringing said speed adjustment member corresponds to a higher speed setting thereof than that to which the pitch control member acting solely is capable of bringing it.

6. The invention set forth in claim 4 in which said second positionable member has a normal position in which it positions the speed adjusting member for normal governor speed regulation, in combination with means for automatically returning said member to its said normal position when it is released by the operator.

7. The invention set forth in claim 4 in combination with means for limiting the travel of said speed adjustment member at the position wherein it sets the governor for controlling the prime mover and airscrew to operate at the maximum safe temporary operating speed.

8. In aircraft having a prime mover, an element for controlling the power output thereof, an adjustable pitch airscrew driven by the prime mover, and an element for controlling the average pitch of said airscrew; the combination of a manually positionable member, a governor for regulating the speeds of said prime mover and said airscrew, including a speed adjusting member for altering the speed at which the governor tends to maintain said prime mover and said airscrew, a first connection from said manually positionable member to the second of said elements to selectively position it in accordance with the position of said member, a second connection from the governor to the first of said elements whereby the governor automatically positions it to regulate speed, a second manually positionable member, and a third connection from said second positionable member to said speed adjusting member to selectively position it in accordance with the position of said second positionable member and a fourth connection from the first manually positionable member to said speed adjusting member.

9. In a rotary wing aircraft having a rotor comprising a hub and a plurality of blades, a pitch control member positionable by the operator to selectively control the average pitch setting of the blades, and a prime mover for driving the rotor; the combination of a second member positionable by the operator, a governor for the prime mover, a speed adjustment member displaceable to alter the speed at which the governor tends to maintain the prime mover, and means jointly responsive to said two positionable members for displacing the speed adjustment member in which the means for displacing the speed adjustment member comprises a cam having a portion of varying cam height and a portion of constant cam height, the portion of constant cam height serving to set the speed adjustment member for the maximum safe speed of operation.

10. The invention set forth in claim 9, means limiting the maximum movement of the pitch control member, whereby the movement of the second positionable member to its full stroke position has a greater effect on the cam than the maximum movement of the pitch control member so that the second member invariably moves the constant cam height portion of the cam into operation.

11. The structure of claim 2; an electric motor; drive means including a gear train interconnecting said motor and blades to adjust the pitch of said blades; a circuit means including a switch for energizing said motor; and further means responsive to the positioning of said pitch control member controlling said switch to close said circuit to energize said motor.

References Cited in the file of this patent
UNITED STATES PATENTS

| | | |
|---|---|---|
| 1,475,869 | Petrie | Nov. 27, 1923 |
| 1,986,709 | Breguet | Jan. 1, 1935 |
| 2,156,976 | Fischel | May 2, 1939 |
| 2,205,625 | Mader | June 25, 1940 |
| 2,343,378 | Kieser | Mar. 7, 1944 |
| 2,373,575 | Lemonier | Apr. 10, 1945 |
| 2,389,161 | McCoy | Nov. 20, 1945 |
| 2,396,590 | McDougal | Mar. 12, 1946 |
| 2,415,622 | Bossi | Feb. 11, 1947 |
| 2,424,523 | Watter | July 22, 1947 |
| 2,550,538 | Doman | Apr. 24, 1951 |
| 2,613,751 | Donovan et al. | Oct. 14, 1952 |
| 2,623,598 | Martin | Dec. 30, 1952 |
| 2,649,161 | Carson | Aug. 18, 1953 |
| 2,650,046 | Vanderlip | Aug. 25, 1953 |